United States Patent [19]

Sivavec

[11] Patent Number: 5,141,998
[45] Date of Patent: Aug. 25, 1992

[54] METHOD FOR MAKING POLYARYLENE ETHER - POLYALKENAMER COPOLYMERS AND PRODUCTS

[75] Inventor: Timothy M. Sivavec, Clifton Park, N.Y.

[73] Assignee: General Electric Company, Schenectady, N.Y.

[21] Appl. No.: 644,650

[22] Filed: Jan. 23, 1991

[51] Int. Cl.⁵ ...................... C08L 71/12; C08F 283/08
[52] U.S. Cl. ..................................... 525/391; 525/905
[58] Field of Search ................................ 525/391, 905

[56] References Cited

U.S. PATENT DOCUMENTS 4,656,220  4/1987  Jadamus et al. .................... 525/132
5,100,972  3/1992  Sivavec et al. ..................... 525/391

Primary Examiner—James J. Seidleck
Assistant Examiner—Thomas Hamilton, III
Attorney, Agent, or Firm—William A. Teoli; James C. Davis, Jr.; William H. Pittman

[57] ABSTRACT

Carbonyl-capped polyphenylene ether is reacted with a cycloalkene, such as cyclooctene using an organometallic catalyst, such as tungsten (VI) chloride/ethyl aluminum dichloride, to produce polyarylene ether/polyoctenamer block copolymers.

9 Claims, No Drawings

METHOD FOR MAKING POLYARYLENE ETHER - POLYALKENAMER COPOLYMERS AND PRODUCTS

REFERENCE TO COPENDING APPLICATIONS

Reference is made to copending application Ser. No. 07/553,036, filed Jul. 16, 1990, now U.S. Pat. No. 5,100,972 and directed to cycloalkene terminated polyarylene ether and polyarylene ether-polyalkenamer copolymers made therefrom.

BACKGROUND OF THE INVENTION

The present invention relates to polyarylene etherpolyalkenamer block copolymers and a method for making such materials. A carbonyl capped polyphenylene ether is reacted with a cycloalkene, for example, cyclooctene, using an organometallic catalyst, such as tungsten (VI) chloride/ethylaluminum dichloride to effect copolymer formation.

Prior to the present invention, graft copolymers of polyphenylene ether and polyalkenamer elastomers could be made by extruding a commercially available polyarylene ether, such as GE's PPO ® resin, having Mannich end groups, with a preformed polyoctenamer (Vestenamer ®) of the Huls Company, Marl, West Germany. Grafting of the unsaturated polyoctenamer polymer to the polyarylene ether is believed to occur through the Mannich end groups.

Alternative procedures for making polyarylene ether-polyalkenamer copolymers are constantly being sought by the plastics industry. Ring opening metathesis polymerization (ROMP) of various cyclic monomers, such as norbornene and cyclooctene, has been used to prepare various unsaturated polymers, such as polynorbornene(Norsorex ®, CDF Chimie) and polyoctenamer.

In copending application Ser. No. 07/553,036, now U.S. Pat. No. 5,100,972, polyphenylene ether-polyalkenamer graft copolymers were made using a cycloalkene-capped polyarylene ether having a manganese (II) chloride catalyst, free of amine. Preferably, the polyarylene ether was capped with a cycloalkene, such as a norbornene, which was joined to the polyarylene ether by an ester linkage. A metal-catalyzed ring-opening polymerization of a suitable cycloalkene, such as norbornene, or cyclooctene, can be effected in the presence of the cycloalkene capped polyarylene ether by using an effective amount of a metallic catalyst, for example a transition metal catalyst, such as a ruthenium halide or osmium halide. The resulting polyphenylene ether-polyalkenamer copolymer is derived from the random incorporation of the cycloalkene of the cycloalkene-capped polyarylene ether into the polyalkenamer prepared by ring-opening metathesis polymerization.

Although useful polyphenylene ether-polyalkenamer graft copolymers involving random incorporation of polyphenylene ether into polyalkenamer, can be made utilizing the aforementioned procedure of employing a cycloalkene capped polyarylene ether, additional procedures for making polyphenylene ether-polyalkenamer copolymers are constantly being sought.

SUMMARY OF THE INVENTION

The present invention is based on the discovery that in place of a cycloalkene capped polyarylene ether which was made with a polyarylene ether, which prior to capping was made without the use of an amine containing catalyst, there can be employed a carbonyl capped polyphenylene ether prepared from a commercially available polyarylene ether, such as GE's PPO ® resin, that contains small amounts of incorporated amines. In addition, the method of copolymer formation is an alkylidene transfer reaction of a polymer-propagating metal carbene with the carbonyl group which has been introduced at the end of the polyphenylene ether chain. A polyarylene ether-polyalkenamer copolymer is provided comprising a polyarylene ether block chemically combined with a polyalkenamer block by a connecting group having the formula, $$-O-\underset{|}{\overset{X}{C}}= \qquad (1)$$

as shown by the following equation,

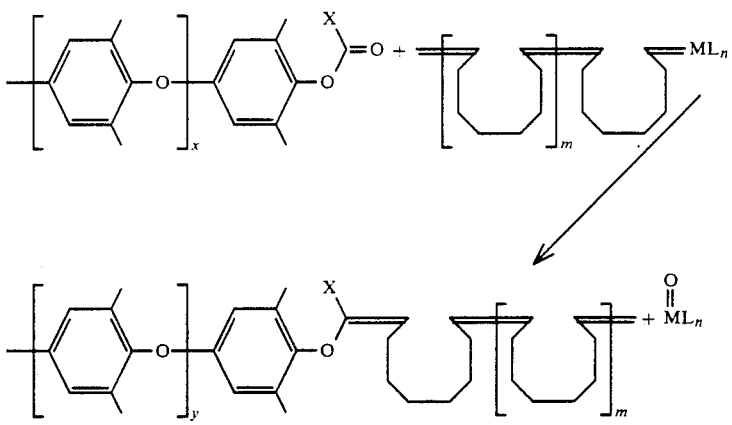

where X is a member selected from $C_{(1-8)}$ alkyl, $C_{(1-8)}$ alkoxy and $C_{(6-13)}$ aryloxy, M is a transition metal such as a Group VI metal such as W, or Mo, or a Group VIII such as Os, and Ru, L is a ligand, for example Cl, and n, x and y are positive integers.

STATEMENT OF THE INVENTION

There is provided by the present invention, a method for making polyarylene ether-polyalkenamer copolymers comprising, (A) effecting reaction between polyarylene ether having a carbonyl terminal group of the formula,

(2)

and 0.5 to 500 parts by weight per part of polyarylene ether, of a cycloalkene in the presence of an amount of a Group VI metal halide catalyst which is capable of effecting a ring-opening metathesis polymerization of the cycloalkene by an alkylidene transfer reaction, and (B) recovering a polyphenylene ether-polyalkenamer copolymer from the mixture of (A) where X is as previously defined.

Some of the cycloalkene monomers which can be polymerized in the practice of the present invention to provide the polyalkenamer blocks for the polyarylene ether-polyalkenamer block copolymers are, for example, cyclobutene, cyclopentene, cycloheptene, cyclooctene, cyclononene, cyclodecene, cyclooctadiene, norbornylene, dicyclopentadiene, 5-norbornene-2-methanol, 7-oxanorbornene and deviatives of the above; cyclooctatetraene and 5-norbornene-2,3-dicarboxylic anhydride.

Polyarylene ethers which can be used in the practice of the present invention have condensed units of the formula,

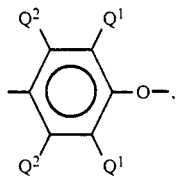

wherein in each of said units independently, each $Q^1$ is independently halogen, primary of secondary lower alkyl (i.e. alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-,3- or 4-methylpentyl and the corresponding heptyl groups. Examples of secondary lower alkyl groups are isopropyl, sec-butyl and 3-pentyl. Preferably, and alkyl radicals are straight chain rather than branched Most often, each $Q^1$ is alkyl or phenyl, especially $C_{1-4}$ alkyl, and each $Q^2$ is hydrogen.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units.

Also included are the coupled polyphenylene ethers in which the coupling agent is reacted in a known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ethers generally have a number average molecular weight within the range of about 3,000–40,000 and weight average molecular weight within the range of about 20,000–80,000, as determined by gel permeation chromatography. Their intrinsic viscosities are most often in the range of about 0.35–0.6 dl/g, as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xyleno (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as o-hydroxyaryl oximes and β-diketones. Also useful are known cobalt-containing catalyst systems.

The invention is particularly applicable to polyphenylene ethers which comprise molecules having an end group of the formula,

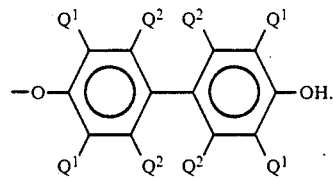

wherein $Q^1$ and $Q^2$ are as previously defined.

The polyarylene ethers having a carbonyl terminal group of formula 2 can be made by effecting reaction between a polyarylene ether as previously defined, and an organo carbonyl halide having the formula,

(3)

where X is as previously defined and Y is a halogen radical such as chloro. Some of the organo carbonyl halides included within formula 3, are for example, acetyl chloride, benzoyl chloride, methyl chloroformate, ethyl chloroformate, phenyl chloroformate, butyl chloroformate.

The reaction between the organo carbonyl halide of formula 3 and the polyarylene ether can be facilitated with the use of a phase transfer catalyst (PTC) such as, tricaprylmethylammonium chloride (Aliquat ®336), or methyltrialkyl ($C_8$–$C_{10}$) ammonium chloride (Adogen ®464). Tert-organic amines such as, N,N-dimethyl-N-butylamine, triethylamine and 4-dimethylaminopyridine also can be used in place of the phase transfer catalyst.

The polyarylene ether-polyalkenamer copolymers of the present invention can be made by effecting reaction between the carbonyl terminated polyarylene ether and the cycloalkene monomers as previously defined in the presence of an effective amount of a metal halide catalyst.

Some of the Group VI or Group VIII metal halide catalysts which can be used in the present invention are for example, $RuCl_3$, $OsCl_3$, $WCl_6$ and $MoCl_5$. These catalysts can be used with cocatalysts such as $SnMe_4$, alkyl aluminum chlorides, alkyl aluminums, and acetylenes. In general, any metal catalysts which are active in alkene metathesis are also included in the method of the present invention.

It has been found that a minor amount of an alkanol, such as ethanol, or water or a mixture thereof, can facilitate reaction as a cocatalyst of the aforementioned metal halide catalyst, such as ruthenium trichloride or osmium trichloride. An effective amount of the transition metal halide catalyst is an amount by weight sufficient to provide from 200 to 5000 parts of metal, per million parts of mixture, and preferably from 400 to 2000 parts of metal, per million parts of mixture of the carbonyl capped polyphenylene ether and the cycloalkene. Polymerization can be conducted in the presence of an organic solvent, such as toluene.

The polyarylene ether-polyalkenamer copolymers of the present invention can be used as high performance injection moldable thermoplastics and as compatibilizers for blends of polyarylene ether and hydrocarbon polymers, such as polyolefins.

In order that those skilled in the art will be better able to practice the present invention, the following examples are given by way of illustration and not by way of limitation. All parts are by weight.

EXAMPLE 1

A solution of 35 grams of a commercially available polyphenylene ether (0.40 dl/g, 0.1079% OH, 850 ppm nitrogen) and 125 ml toluene (25% solids, w/w) was vigorously stirred in a blender at room temperature. There was added to the solution, 180 mg Aliquat ®336 (tricaprylylmethylammonium chloride) and 10 ml of a 50% (w/w) NaOH solution. After 2 minutes of blending, acetyl chloride (1.4 g, 4 weight % relative to polyphenylene ether) was added dropwise by syringe. The reaction mixture was blended for 5 minutes, diluted with an additional 100 ml toluene, and precipitated by the addition of methanol. The polymer was collected by filtration, redissolved in 200 ml toluene and reprecipitated by the addition of methanol. The modified polyphenylene ether was collected by filtration, washed and methanol and dried in vacuo at 80° C. for 12 hours. There was found polyphenylene ether hydroxyl content at 3610 $cm^{-1}$: less than 0.002% OH; $^{13}C$ NMR ($CDCl_3$) 168.9 ppm C=O. Polyphenylene ether-carbonyl absorbance: 1762 $cm^{-1}$. FTIR carbonyl analysis indicated 1.67 acetate groups per polyphenylene ether chain was incorporated.

A solution of 8.46 grams of the above acetate capped polyphenylene ether dissolved in 60 ml of toluene which had been heated at reflux to completely dissolve the polyphenylene ether was allowed to cool to room temperature. It was added to the polyphenylene ether solution, a solution of 5 mole (10.0 ml or 8.46 grams of cyclooctene) and 16.9 ml of toluene. There was also added in solution, 0.378 mmol (150 mg) of $WCl_6$ from a 0.05 mole toluene stock solution and 1.89 mmol $EtAlCl_2$ (1.05 ml of a 1.8M solution) in toluene ($EtAlCl_2/WCl_6=5.00$, cyclooctene/W=203). The solution was mechanically stirred under a nitrogen atmosphere at room temperature for 24 hours. The reaction was quenched by the slow addition of 25 ml MeOH. The polymer solution was transferred to a blender and precipitated by the addition of a mixture of methanol/acetone (2:1). The polymer was collected by filtration, washed and methanol/acetone and dried in vacuo at 80° C. for 12 hours. Yield: 9.48 g of a polyphenylene ether-polyoctenamer blend with composition 89/11 polyphenylene ether-polyoctenamer (12%) yield of polyoctenamer assuming 100% recovery of acetate-capped polyphenylene ether.

$^1H$ NMR ($CDCl_3$) 6.44 (br s, polyphenylene ether), 5.35 (br m), 206 (br s, polyphenylene ether), 1.94 (br m), 1.26 ppm (br s) relative to internal TMS. Integration of polyphenylene ether resonances relative to polyoctenamer indicated an 86/14 polyphenylene ether-polyoctenamer composition. $^{13}C$ NMR ($CDCl_3$) 154.75 (polyphenylene ether), 145.46 (polyphenylene ether), 132.56 (polyphenylene ether), 130.26, 129.79, 114.47 (polyphenylene ether), 32.51, 29.56, 28.96, 27.12, 16.78 (polyphenylene ether). Comparison of polyphenylene ether aromatic carbon peak intensities to polyoctenamer alkene intensities (130.26 and 129.79, trans and cis, respectively) indicated a 90/10 polyphenylene ether-polyoctenamer composition. Comparison of the peak intensities of the trans-polyoctenamer resonance (130.26) with that of the cis (129.79) gave a 65/35 cis-trans ratio.

EXAMPLE 2

In accordance with Example 1, a solution of 8.82 grams of cyclooctadiene and 16.3 ml of toluene was added to 8.82 grams of the acetate-capped polyphenylene ether dissolved in 60 ml of toluene and prepared in accordance with the method of Example 1. To the polyphenylene ether solution, there was added 0.378 mmol (150 mg) $WCl_6$ from a 0.05M toluene stock solution and 1.89 mmol $EtAlCl_2$ (1.05 ml of a 1.8M solution in toluene) ($EtAlCl_2/WCl_6=5.00$, cyclooctene/W=216). The solution was mechanically stirred under a nitrogen atmosphere at room temperature for 24 hours. The reaction was quenched by the slow addition of 25 ml MeOH. The polymer solution was transferred to a blender and precipitated by the addition methanol/acetone (2:1). The polymer was collected by filtration, washed with methanol/acetone and dried in vacuo at 80° C. for 12 hours. Yield: 16.5 g of a 53.5/46.5 polyphenylene ether-polyoctenamer composition (7.68 g or 87% yield of polyoctenamer assuming 100% recovery of acetate-capped polyphenylene ether).

$^1H$ NMR ($CDCl_3$) 6.47 (br s, polyphenylene ether), 5.41 (br m), 2.09 (br s, polyphenylene ether), 1.56 (br), relative to internal TMS. Integration of polyphenylene ether resonances relative to polyoctenamer indicated a 55/45 polyphenylene ether-polybutenamer composition. $^{13}C$ NMR ($CDCl_3$), 154.60 (polyphenylene ether), 145.31 (polyphenylene ether), 132.43 (polyphenylene ether), 130.61, 129.90, 114.23 (polyphenylene ether), 32.59, 29.56, 27.30, 16.66 (polyphenylene ether). Comparison of the peak intensities of the trans-polybutenamer resonance (130.61) with that of the cis-polybutenamer (129.90) gave 43/57 cis-trans ratio.

Methylene complexation of a 2.00 g sample as described above gave 0.96g polyphenylene ether-polybutenamer with 62/38 polyphenylene ether-polybutenamer composition as shown by $^1$H NMR.

Exhaustive heptane extraction of a 1.5 g sample of the initially isolated polyphenylene ether-polybutenamer blend afforded 0.23 g polybutenamer (30% from initial 53.5/46.5 composition) that was shown by $^1$H NMR to be contaminated with 16% polyphenylene ether. The polyphenylene ether-polybutenamer that was not extracted with heptane (1.26 g) was determined to be 65/35 polyphenylene ether-polybutenamer.

EXAMPLE 3

Additional polyarylene ether-polyalkenamer copolymers were prepared employing phenyl carbonate-capped polyphenylene ether and methyl carbonate-capped polyphenylene ether. The phenyl carbonate-capped polyphenylene ether was prepared by initially dissolving 35 grams of a commerical polyphenylene ether (0.40 dl/g, 0.1079% OH, 850 ppm nitrogen) in 125 ml of toluene at room temperature. It was added to this solution 180 mg Aliquat®336 (tricaprylylmethylammonium chloride) and 10 ml of a 50% (w/w) NaOH solution. After 2 minutes of blending, phenyl chloroformate (1.4 g, 1.2 ml, 4 weight % relative to polyphenylene ether) was added dropwise by syringe. The reaction mixture was blended for 5 minutes, diluted with an additional 100 ml toluene, and precipitated by the addition of methanol. The polymer was collected by filtration, redissolved in 200 ml toluene and precipitated by the addition of methanol. The modified polyphenylene ether was collected by filtration, washed with methanol and dried in vacuo at 80° C. for 12 hours. polyphenylene ether hydroxyl ( content at 3610 cm$^{-1}$: less than 0.002% OH; polyphenylene ether-carbonyl absorbance: 1776 cm$^{-1}$. $^{13}$C NMR (CDCl$_3$) 175.1 ppm C=O.

The extinction coefficient of the 1782 cm$^{-1}$ absorbance of diphenyl carbonate (a model for phenyl carbonate-capped polyphenylene ether) in CS$_2$ was used to calculate the average number of phenyl carbonate end caps per polyphenylene ether chain. Analysis of the FTIR spectrum in the carbonyl region of the above isolated polyphenylene ether indicated 0.89 phenyl carbonate groups per polyphenylene ether chain were incorporated.

EXAMPLE 4

Methyl carbonate-capped polyphenylene ether was also made by a phase transfer catalyzed (PTC) procedure or a 4-dimethylaminopyridine (DMAP procedure). There was added to the solution of 35 grams of the polyphenylene ether in toluene 180 mg Aliquat®336 (tricaprylylmethylammonium chloride) and 10 ml of a 50% (w/w) NaOH solution. After 2 minutes of blending, methyl chloroformate (1.4 g, 4 weight % relative to polyphenylene ether) was added dropwise by syringe. The reaction mixture was blended for 5 minutes, diluted with an additional 100 ml toluene, and precipitated by the addition of methanol. The polymer was collected by filtration, redissolved in 200 ml toluene and reprecipitated by the addition of methanol. The modified polyphenylene ether was collected by filtration, washed with methanol and dried in vacuo at 80° C. for 17 hours. Polyphenylene ether hydroxyl content at 3610 cm$^{-1}$: less than 0.002% OH; polyphenylene ether-carbonyl absorbance: 1764 cm$^{-1}$. $^{13}$C NMR (CDCl$_3$) 175.1 ppm C=O.

The extinction coefficient of the 1763 cm$^{-1}$ absorbance of 2,4,6-trimethylphenyl methyl carbonate (a model for methyl carbonate-capped polyphenylene ether) in CS$_2$ was used to calculate the average number of methyl carbonate end caps per polyphenylene ether chain. Analysis of the FTIR spectrum in the carbonyl region of the above isolated polyphenylene ether resin indicated 0.81 methyl carbonate groups per polyphenylene ether chain were incorporated.

The methyl carbonate-capped polyphenylene ether which was prepared by the DMAP procedure utilized 100 grams of the polyphenylene ether and 1 L of toluene 6.10 grams of 4-dimethylaminopyridine and 4.73 grams of methyl chloroformate. The reaction mixture was heated at 60° C. for 12 hours, cooled to room temperature and precipitated by the addition of methanol. The precipitated methyl carbonate-capped polyphenylene ether was collected by filtration, washed with methanol and dried in vacuo at 80° C. for 12 hours.

Additional polyphenylene ether-polyalkenamer compositions were prepared employing the acetate and carbonate-capped polyphenylene ether and various cycloalkenes as shown by the following table:

TABLE

| Monomer | Capped Polyphenylene Ether[a] | Ratio of Monomer/ Polyphenylene Ether[b] | Catalyst | Monomer/ Catalyst | % Yield Polyalkenamer | Polyphenylene Ether-polyalkenamer ratio of copolymer[c] |
|---|---|---|---|---|---|---|
| Cyclooctene | acetate/DMAP[d] | 1.41 | WCl$_6$/EtAlCl$_2$[e] | 203 | 22 | 60/40 |
| Cyclooctene | acetate/ptc | 1.00 | WCl$_6$/EtAlCl$_2$ | 203 | 12 | 90/10 |
| Cyclooctene | methyl carbonate/ptc | 1.00 | WCl$_6$/EtAlCl$_2$ | 500 | 32 | 71/29 |
| Cyclooctene | phenyl carbonate/ptc | 1.00 | MoCl$_5$/Ph$_4$Sn[f] | 205 | 28 | 75/24 |
| 1,5-cyclooctadiene | acetate/ptc | 1.00 | WCl$_6$/EtAlCl$_2$ | 216 | 87 | 62/38 |
| 1,5-cyclooctadiene | acetate/DMAP | 1.47 | WCl$_6$/EtAlCl$_2$ | 500 | 20 | 88/12 |
| 1,5-cyclooctadiene | acetate/DMAP | 2.20 | Br(CO)4W≡CMe/ EtAlCl$_2$ | 500 | 12 | 91/9 |
| Cyclooctene + 1,5-cyclooctadiene (1:1) | acetate/DMAP | 1.00 | WCl$_6$/EtAlCl$_2$ | 500 | 12 | 90/10 |
| Cyclooctene + 1,5-cyclooctadiene | methyl carbonate/ptc | 1.00 | WCl$_6$/EtAlCl$_2$ | 500 | 18 | 87/13 |

| Monomer | Capped Polyphenylene Ether[a] | Ratio of Monomer/ Polyphenylene Ether[b] | Catalyst | Monomer/ Catalyst | % Yield Polyalkenamer | Polyphenylene Ether-polyalkenamer ratio of copolymer[c] |
|---|---|---|---|---|---|---|
| (1:1) | | | | | | |

[a]DMAP: capped polyphenylene ether prepared using 4-dimethylaminopyridine procedure; ptc: capped polyphenylene ether prepared using phase transfer catalyzed procedure.
[b]Cycloalkene/capped polyphenylene ether resin ration (w/w).
[c]Composition of copolymer determined by the methylene chloride complexation method for polyphenylene ether-polyoctenamer blends and by toluene extraction of pressed films of polyphenylene ether-polybutenamer blends.
[d]Acetate-capped polyphenylene ether resin in this example was from polyphenylene ether prepared using the manganese (II) chloride/benzoin oxime catalyst with no added amines (78 ppm nitrogen).
[e]WCl$_6$/EtAlCl$_2$ = 0.2.
[f]MoCl$_5$/Ph$_4$Sn = 0.25.

Although the above examples are directed to only a few of the very many variables which can be used in the practice of the present invention, it should be understood that the present invention is directed to a much broader variety of polyarylene ether-polyoctenamer copolymers and methods for making.

What is claimed is:

1. Polyarylene ether-polyalkenamer copolymer comprising a polyarylene ether block chemically combined with a polyalkenamer block by a connecting group having the formula,

where X is a member selected from the class consisting of C$_{(1-8)}$ alkyl, C$_{(1-8)}$ alkoxy, and C$_{(6-13)}$ aryloxy.

2. A polyarylene ether-polyalkenamer copolymer in accordance with claim 1, where the polyalkenamer block consists essentially of chemically combined octylene radicals.

3. A polyarylene ether-polyalkenamer copolymer in accordance with claim 1, where X is methyl.

4. A polyarylene ether-polyalkenamer copolymer in accordance with claim 1, where X is methoxy.

5. A polyarylene ether-polyalkenamer copolymer in accordance with claim 1, where X is phenoxy.

6. A method for making a polyarylene ether-polyalkenamer copolymer which comprises:
(A) effecting reaction between polyarylene ether having a carbonyl terminal group of the formula,

and 0.5 to 500 parts by weight of a cycloalkene per part of polyarylene ether in the presence of an amount of a transition metal halide catalyst which is capable of producing ring opening metathesis polymerization of the cycloalkene by an alkylidene transfer reaction, and
(B) recovering a polyphenylene ether-polyalkenamer copolymer from the mixture of (A), where X is a member selected from the class consisting of C$_{(1-8)}$ alkyl, C$_{(1-8)}$ alkoxy, C$_{(6-13)}$ aryloxy.

7. A method in accordance with claim 6, where the polyarylene ether is a polyphenylene ether.

8. A method in accordance with claim 1, where the transition metal halide catalyst is WCl$_6$/EtAlCl$_2$.

9. A method in accordance with claim 6, where the polyphenylene ether is a poly(2,6-dimethyl-1,4-phenylene)ether.

* * * * *